US011168958B2

(12) United States Patent
Shimizu

(10) Patent No.: US 11,168,958 B2
(45) Date of Patent: Nov. 9, 2021

(54) SIGHTING SCOPE

(71) Applicant: DEON Optical Design Corporation, Chino (JP)

(72) Inventor: Fumio Shimizu, Chino (JP)

(73) Assignee: DEON OPTICAL DESIGN CORPORATION, Nagano (JP)

( * ) Notice: Subject to any disclaimer, the term of this patent is extended or adjusted under 35 U.S.C. 154(b) by 460 days.

(21) Appl. No.: 16/212,183

(22) Filed: Dec. 6, 2018

(65) Prior Publication Data

US 2019/0243121 A1 Aug. 8, 2019

(30) Foreign Application Priority Data

Feb. 8, 2018 (JP) .............................. JP2018-021089

(51) Int. Cl.
*F41G 1/16* (2006.01)
*F41G 1/38* (2006.01)
*G02B 23/16* (2006.01)

(52) U.S. Cl.
CPC ................. *F41G 1/16* (2013.01); *F41G 1/38* (2013.01); *F41G 1/383* (2013.01); *G02B 23/16* (2013.01)

(58) Field of Classification Search
CPC ..... F41G 1/16; F41G 1/26; F41G 1/28; F41G 1/38; F41G 1/383; F41G 1/387; G02B 1/16
USPC ................................... 42/124, 125, 126, 138
See application file for complete search history.

(56) References Cited

U.S. PATENT DOCUMENTS

| 2,452,592 | A | * | 11/1948 | Meyer | ....................... | F41G 1/38 33/298 |
| 2,578,130 | A | * | 12/1951 | Ford | ......................... | F41G 1/38 33/298 |
| 3,205,580 | A | | 9/1965 | Osborn | | |
| 3,471,932 | A | * | 10/1969 | Luning | ................. | F41G 11/001 42/126 |
| 3,506,330 | A | * | 4/1970 | Allen | ..................... | G02B 23/14 356/397 |

(Continued)

FOREIGN PATENT DOCUMENTS

| JP | 274299 | 9/1926 |
| JP | 3920054 | 9/1939 |

(Continued)

OTHER PUBLICATIONS

Extended European Search Report dated Apr. 9, 2019 for European Patent Application No. 18211426.4.

(Continued)

*Primary Examiner* — Bret Hayes
(74) *Attorney, Agent, or Firm* — Lucas & Mercanti, LLP

(57) ABSTRACT

A sighting scope 1 includes; a scope body 2; an outer frame 3 covering at least a middle portion along an optical axis of the scope body; a rotational support structure which rotatably support the scope body 2 around a rotational axis located on a plane orthogonal to the optical axis in the outer frame; a rotational sliding contact portion which is placed between the scope body and one of opening edges at ends of the outer frame located on front and back sides of the rotational axis along the optical axis, and which is designed to be able to slide around the rotational axis; and an angular adjustment mechanism which can adjust an inclined angle of the scope body with respect to the outer frame.

9 Claims, 1 Drawing Sheet

(56) References Cited

U.S. PATENT DOCUMENTS

| | | | |
|---|---|---|---|
| 4,806,007 A | 2/1989 | Bindon | |
| 6,640,481 B1 | 11/2003 | Williams, Jr. | |
| 7,676,137 B2 | 3/2010 | Schick et al. | |
| 8,009,958 B1 | 8/2011 | Schick et al. | |
| 8,254,746 B2 | 8/2012 | Schick et al. | |
| 8,364,002 B2 | 1/2013 | Schick et al. | |
| 2006/0168871 A1* | 8/2006 | Wagner | G02B 23/14 42/122 |
| 2012/0275038 A1 | 11/2012 | Hughes | |
| 2018/0252498 A1* | 9/2018 | Zimmermann | F41G 1/38 |

FOREIGN PATENT DOCUMENTS

| | | |
|---|---|---|
| JP | 5345637 | 1/1978 |
| JP | 58011716 U1 | 1/1983 |
| JP | 61053722 U1 | 4/1986 |
| JP | 2632976 B2 | 4/1997 |
| JP | 09318296 A | 12/1997 |

OTHER PUBLICATIONS

IP Australia, Examination Report for the corresponding Australian patent application No. 2018271245, dated Sep. 3, 2019 (4 pages).

* cited by examiner

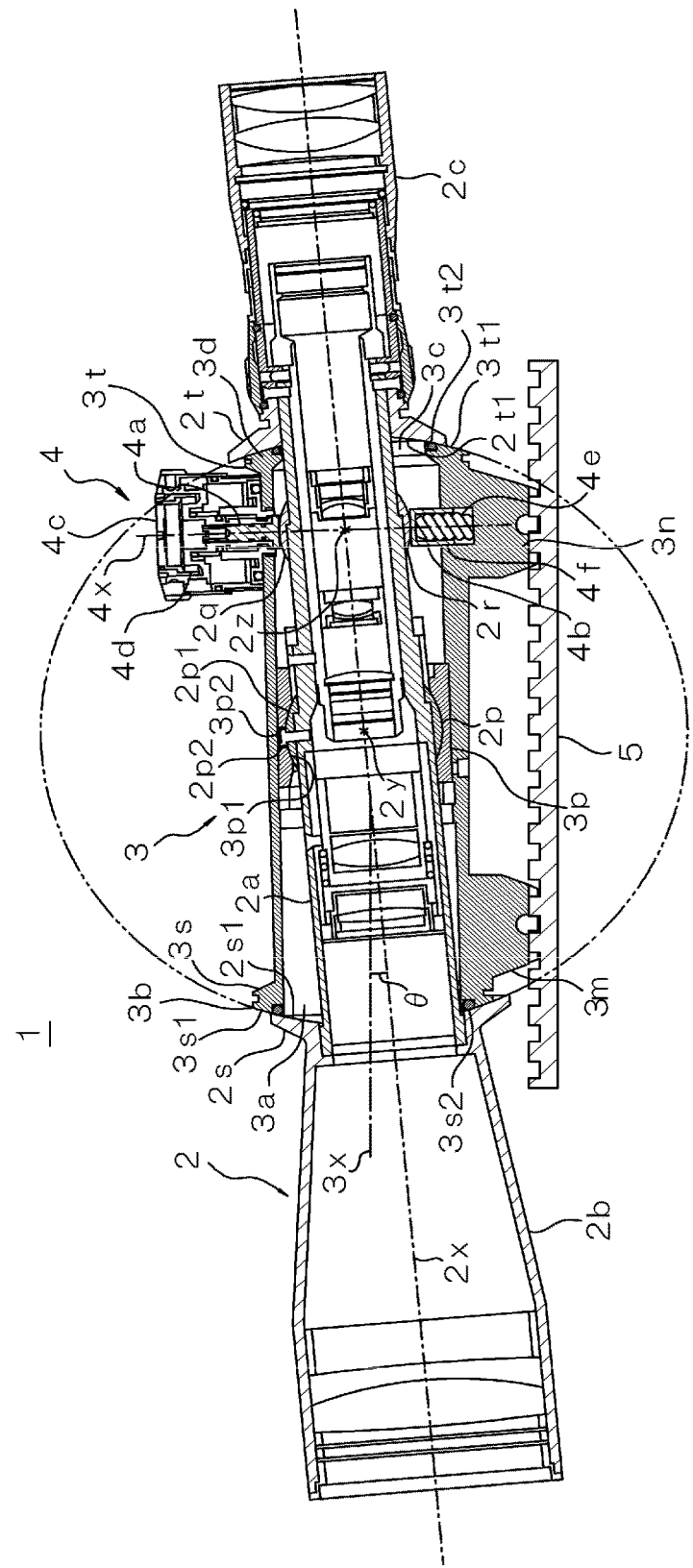

SIGHTING SCOPE

CROSS REFERENCE TO RELATED APPLICATION

This Application claims the priority of Japanese Application 2018-021089 filed on Feb. 8, 2018, which is incorporated herein by reference.

FIELD

The disclosure relates to a sighting scope used on firearms such as guns and rifles, or used for shooting competition such as clay shooting or archery etc.

BACKGROUND

Heretofore, sighting scopes are used on firearms or used for shooting competition. One of the sighting scopes is known for having an angular adjustment mechanism (a landing point adjustment mechanism) which is designed for angle adjustment in an inclined angle of an inner tube. The inner tube includes a reticle (lines in the sight such as a cross-hair) and is built into a scope body of the sighting scope. The inner tube can incline in the scope body as described in Japanese Unexamined Patent Application Publication No. H09-318296 or International Patent Publication No. WO/US2016/059021.

The other sighting scope in which a whole scope can incline with respect to a base fixed on a body of a firearm exists from old times. An angular adjustment mechanism (a landing point adjustment mechanism) installed on this sighting scope is designed to permit adjustment for an inclined angle of the whole scope with respect to the base.

As for both of the above sighting scopes, high precision of the angular adjustment mechanism is demanded, and high stiffness is demanded. The high stiffness means the capability to withstand considerable impact of shooting and so on and to keep an inclined angle of the sighting scopes. However, it is difficult to achieve compatibility between the high precision and the high stiffness. There is also a problem which increasing manufacturers' cost or expansion in size frequently comes about in order to achieve the compatibility between the high precision and the high stiffness.

Furthermore, with regard to the above sighting scope configured to be able to incline the inner tube with respect to the scope body, excessively inclination of the inner tube leads to degradation of optical performance such as deterioration of images, because a misalignment of an optical axis in the inner tube with respect to an optical axis of the scope body increases. In contrast with above case, with reference to the above sighting scopes configured to be able to incline the whole scope with respect to the base, the angular adjustment mechanism is exposed on the outside and then the fire dust and the like easily enter into the mechanism. For this reason, there are problems which the adjusting precision declines and the alteration in the inclined angle of the inner tube easily happens due to a shock of shooting.

Thus, it is preferable to provide a sighting scope to be able to achieve compatibility between high adjusting precision and high shock resistance.

SUMMARY

A sighting scope comprises a scope body and an outer frame covering at least a middle portion along an optical axis of the scope body. The sighting scope includes a rotational support structure. The rotational support structure rotatably supports the scope body around a rotational axis located on a plane orthogonal to the optical axis inside of the outer frame. The sighting scope includes a rotational contact portion. The rotational sliding contact portion is placed between the scope body and one of opening edges at ends of the outer frame. The ends are located on front and back sides of the rotational axis along the optical axis. The rotational sliding contact portion is designed to be able to slide around the rotational axis. The sighting scope includes an angular adjustment mechanism. The angular adjustment mechanism can adjust an inclined angle of the scope body with respect to the outer frame. The scope body may be rotatably supported around a plurality of the rotational axes located on a plane orthogonal to the optical axis by the rotational support structure.

In one embodiment, it is preferable to further include a second rotational sliding contact portion. The second rotational sliding contact portion is placed between the scope body and the other of the opening edges at the ends of the outer frame. The second rotational sliding contact portion is designed to be able to slide around the rotational axis. In this case, it is more preferable that a sliding contact radius of the rotational sliding contact portion and a sliding contact radius of the second rotational sliding contact portion are the same.

In another embodiment, it is preferable that the rotational support structure is a spherical support structure to rotatably support the scope body around a spherical center position located on the rotational axis. And it is also preferable that both of the rotational sliding contact portion and the second rotational sliding contact portion are spherical sliding contact portions to be in rotatably sliding contact in a manner to be centered at the spherical center position.

In still another embodiment, it is preferable that the rotational sliding contact portion is configured around whole the opening edge located on the end of the outer frame. The rotational sliding contact portion closes a space between a surface of the scope body and the end of the outer frame. Especially, it is preferable that both of the rotational sliding contact portion and the second rotational sliding contact portion are configured as described above when these sliding contact portions are located on each of one side and the other side.

Another aspect of a sighting scope comprises a scope body and an outer frame covering at least a middle portion along an optical axis of the scope body. The sliding scope includes a first rotational sliding contact portion and a second rotational sliding contact portion. The first rotational sliding contact portion is placed between the scope body and one of opening edges at ends of the outer frame. The ends are located on front and back sides along the optical axis in the outer frame. The first rotational contact portion is designed to be able to slide around a rotational axis situated on a plane orthogonal to the optical axis. The second rotational sliding contact portion is placed between the scope body and the other of opening edges at the ends of the outer frame. The second rotational contact portion is designed to be able to slide around the rotational axis. The sighting scope includes an angular adjustment mechanism. The angular adjustment mechanism can adjust an inclined angle of the scope body with respect to the outer frame. In this case, it is preferable that a sliding contact radius of the first rotational sliding contact portion, and a sliding contact radius of the second rotational sliding contact portion are the same.

In a different embodiment, it is preferable that the first rotational sliding contact portion is a spherical surface sliding contact portion to be in rotatably sliding contact in a manner to be centered at a spherical center position located on the rotational axis. And it is also preferable that the second rotational sliding contact portion is a spherical surface sliding contact portion to be in rotatably sliding contact in a manner to be centered at a spherical center position located on the rotational axis. Further, it is preferable that at least one of the first rotational sliding contact portion and the second rotational sliding contact portion is configured around whole the opening edges located on the ends of the outer frame. The one closes a space between a surface of the scope body and the ends of the outer frame. Specially, it is more preferable that both of the first rotational sliding contact portion and the second rotational sliding contact portion are configured as presented above when these sliding contact portions are located on each of one side and the other side.

Further aspect of a sighting scope comprising a scope body and an outer frame covering at least a middle portion along an optical axis of the scope body. The sighting scope comprises a spherical support structure. The spherical support structure rotatably supports the scope body around a spherical center positon located on a plane orthogonal to the optical axis inside of the outer frame. The sighting scope comprises an angular adjustment mechanism. The adjustment mechanism can adjust an inclined angle of the scope body with respect to the outer frame.

The sighting scope may further comprise a spherical sliding contact portion. The spherical sliding contact portion is placed between the scope body and one of opening edges at ends of the outer frame. The ends are located on front and back sides of the spherical center position along the optical axis. The sighting scope is designed to be able to slide around the spherical center position.

The sighting scope may further comprise a second rotational sliding contact portion. The second rotational sliding contact portion is placed between the scope body and the other of the opening edges at the ends of the outer frame. The second rotational sliding contact portion is designed to be able to slide around the spherical center position.

According to the sighting scope, it is achievable that the compatibility between high adjusting precision and high shock resistance.

BRIEF DESCRIPTION OF THE DRAWINGS

FIG. 1 is a cross sectional view schematically showing simplified structure of a sighting telescope for an exemplary embodiment of a sighting scope.

DETAILED DESCRIPTION

An embodiment of a sighting scope will be described in detail with reference to an accompanying drawing. Firstly, a general structure of the embodiment of the sighting scope will be described.

A sighting telescope (hereinafter it is also referred to as "a sighting scope") 1 of the present embodiment includes a telescope body (hereinafter it is also referred to as "a scope body") 2, and an outer frame 3 covering at least a middle portion 2a of this telescope body 2. The telescope body 2 has an object side portion 2b and an eyepiece side portion 2c located on each of both sides of the above middle portion 2a along an axis 2x (this is corresponding to an optical axis in FIG. 1). As shown in FIG. 1, a reticle (lines in the sight such as a cross-hair) and an erecting lens group and so on are installed in the above middle portion 2a. An object lens group is installed in the above object side portion 2b. An eyepiece lens group is installed in the above eyepiece side portion 2c. A pivotally supported portion 2p is located on an outer surface area in a region of the above middle portion 2a, which is covering by the above outer frame 3. The support portion 2p includes a supported surface 2p1 which has a shape of a convex spherical surface centered on a spherical center position 2y. It means that the supported surface 2p1 is a part of a sphere and the spherical center position 2y is a center of this sphere. Here, the supported portion 2p is fixed on the above middle portion 2a by means of a fastener 2p2 such as a bolt. It is preferable that the spherical center position 2y is located on the axis 2x as shown in FIG. 1. But this position 2y is not limited on the axis 2x. Structurally, the spherical center position 2y may be situated inside of the outer frame 3 described later.

Moreover, the outer frame 3 is formed in a tubular shape (preferably in a cylindrical shape) along an axis 3x. The outer frame 3 has an object side end 3b and an eyepiece side end 3d. The object side end 3b includes an object side opening 3a, and the eyepiece side end 3d includes an eyepiece side opening 3c. A pivotally supporting portion 3p is located in the middle position of the outer frame 3, and has a supporting surface 3p1 which has a shape of a concave spherical surface corresponding to the above supported portion 2p. The supporting portion 3p includes a depressed portion 3p2 which is formed on the supporting surface 3p1. This depressed portion 3p2 pus in a head of the above fastener 2p2. In this situation, sliding contact of the supported surface 2p1 with the supporting surface 3p1 is achievable. A rotational range of the telescope body 2 with respect to the outer frame 3 is determined due to positional relation between a space in the depressed portion 3p2 and the head of the fastener 2p2. As illustrated in FIG. 1, the outer frame 3 merely covers the middle portion 2a of the telescope body 2, and does not cover the above object side portion 2b and the above eyepiece side portion 2c of the telescope body 2. The above object side portion 2b and the above eyepiece side portion 2c are exposed on the outside of the outer frame 3.

The above telescope body 2 includes a spherical surface sliding contact area (hereinafter it is also referred to as "a rotational sliding contact area") 2s on an object side which faces an opening edge of the object side end 3b in the outer frame 3. Referring to FIG. 1, the spherical surface sliding contact area 2s on the object side has a shape of a flange extending circularly to the outside. A surface of this spherical surface sliding contact area 2s on the object side faces toward the above object side end 3b, and is a sliding surface 2s1 on the object side. The sliding surface 2s1 on the object side is formed in a concave spherical shape centered at the spherical center position 2y. It means that the sliding surface 2s1 on the object side is a part of a sphere and the spherical center position 2y is the center of this sphere.

Moreover, the telescope body 2 has a spherical surface sliding contact area (hereinafter it is also referred as "a rotational sliding contact area") 2t on an eyepiece side which faces an opening edge of the eyepiece side end 3d in the outer frame 3. As shown in FIG. 1, the spherical surface sliding contact area 2t on the eyepiece side has a shape of a flange extending circularly to the outside. A surface of this spherical surface sliding contact area 2t on the eyepiece side faces toward the above eyepiece side end 3d, and is a sliding surface 2t1 on the eyepiece side. The sliding surface 2t1 on the eyepiece side is formed in a concave spherical shape centered at the spherical center positon 2y. It means that the sliding surface 2t1 on the eyepiece side is a part of a sphere and the spherical center position 2y is the center of this sphere.

The above outer frame 3 includes a spherical surface sliding contact area (hereinafter it is also "a rotational sliding contact area") 3s on the object side which faces the above spherical surface sliding contact area 2s on the object side. In FIG. 1, the spherical surface sliding contact area 3s on the object side has a shape of a rib extending circularly to the outside. A surface of this spherical surface sliding contact area 3s on the object side faces toward the above spherical surface sliding contact area 2s on the object side, and is a sliding surface 3s1 on the object side. These structures 2s, 3s in the object side constitute a (first) spherical sliding contact portion (hereinafter it is referred to as "a rotational sliding contact portion") in the object side. The sliding surface 3s1 on the object side is formed in a convex spherical shape centered at the spherical center position 2y. It means that the sliding surface 3s1 on the object side is a part of a sphere and the spherical center position 2y is the center of this sphere.

Furthermore, the outer frame 3 has a spherical surface sliding contact area (hereinafter it is also "a rotational sliding contact area") 3t on the eyepiece side which faces the spherical surface sliding contact area 2t on the eyepiece side in the telescope body 2. As shown in FIG. 1, the spherical surface sliding contact area 3t on the eyepiece side is a shape of a rib extending circularly to the outside. A surface of this spherical surface sliding contact area 3t on the eyepiece side faces toward the above spherical surface sliding contact area 2t on the eyepiece side, and is a sliding surface 3t1 on the eyepiece side. These structures 2t, 3t in the eyepiece side constitute a (second) spherical sliding contact portion (hereinafter it is also referred to as "a rotational sliding contact portion") in the eyepiece side. The sliding surface 3t1 on the eyepiece side is formed in a convex spherical shape centered at the spherical center position 2y. It means that the sliding surface 3t1 on the eyepiece side is a part of a sphere and the spherical center position 2y is the center of this sphere.

The outer frame 3 contains connect portions 3m, 3n which are formed in the lower part of the outer frame 3. The connect portions 3m, 3n can attachably and detachably connect to a base 5 which is mounted on a body such as a firearm, gun, rifle and other shooting apparatuses etc. The connect portions 3m, 3n can fix to a selected mounting site on the base 5 by means of an unillustrated mounting mechanism.

The above sliding surfaces 2s1, 3s1 on the object side are spherical surfaces which mutually have the same spherical center position and the same spherical radius, and slidably contact each other. A seal member 3s2 is located between both of the sliding surfaces 2s1, 3s1. As illustrated in FIG. 1, the seal member 3s2 is attached to the spherical surface sliding contact area 3s on the object side, but it may be attached to the spherical surface sliding contact area 2s on the object side. As the same as the above-mentioned, the above sliding surfaces 2t1, 3t1 on the eyepiece side are spherical surfaces which mutually have the same spherical center position and the same spherical radius, and slidably contact each other. A seal member 3t2 is located between both of the slide surfaces 2t1, 3t1. Referring to FIG. 1, the seal member 3t2 is attached to the spherical surface sliding contact area 3t on the eyepiece side, but it may be attached to the spherical surface sliding contact area 2t on the eyepiece side. Further, both of the spherical surface sliding contact areas 2s, 3s (these areas are included in the first spherical sliding contact portion) on the object side and the spherical surface sliding contact areas 2t, 3t (these areas are included in the second spherical sliding contact portion) on the eyepiece side, are formed along the same sphere (as illustrated by a two-dot chain line) centered at the spherical center position 2y. In addition, both of the spherical surface sliding contact areas 2s, 3s on the object side and the spherical surface sliding contact areas 2t, 3t on the eyepiece side should be formed on a spherical surface centered at the spherical center position 2y. In contrast to the FIG. 1, the spherical surface sliding contact areas 2s, 3s on the object side and the spherical surface sliding contact areas 2t, 3t on the eyepiece side may be not mutually formed along a spherical surface that has the same spherical radius. This means that they may be formed along different spherical surfaces that have different spherical radius, on the condition that they mutually have the same spherical center position.

In the present embodiment, an angle adjustment mechanism 4 is formed at a location distant from the above spherical center position 2y along the above axis 2x. This angle adjustment mechanism 4 includes a driving shaft 4a and a receiving shaft 4b. The driving shaft 4a can move along an axis 4x crossing (orthogonal) to the axis 2x. The driving shaft 4a is located on a position 2z which is situated on the above axis 2x and which is away from the spherical center position 2y within a region which the telescope body 2 is covering by the outer frame 3. The receiving shaft 4b is located on opposite side of the driving shaft 4a across a part (the middle portion 2b) of the telescope body 2 which located in the above region.

The driving shaft 4a can move in and out along the axis 4x through a driving mechanism 4d due to rotation of a dial 4c protruding outward, and can contact with a contact portion 2q on an outer surface of the telescope body 2 in the above region, so that the driving shaft 4a is designed to be able to adjust an inclined angle θ of the axis 2x of the telescope body 2 with respect to the axis 3x of the outer frame 3.

Furthermore, the receiving shaft 4b has an elastic body 4e and a receiving member 4f The elastic body 4e elastically deforms corresponding to an in and out motion of the above driving shaft 4a, so that the receiving member 4f moves along the axis 4x, and then the receiving shaft 4b remains in contact with a contact portion 2r which is located on the outer surface of the telescope body 2 in the above region. As a consequence, the driving shaft 4a continues to be in contact with the contact portion 2q. It is preferable that both the contact portions 2q, 2r include a contact surface which is a shape of a spherical surface or a cylindrical surface centered at a center point (or a center axis) on the axis 4x. For instance, this center point (or this center axis) is a point 2z of intersection between the axes 2x and 4x (or is an axis 2z which passes through this point of intersection and which is orthogonal to both the axes 2x and 4x).

The angle adjustment mechanism 4 as shown in FIG. 1 is designed to adjust the inclined angle θ (an elevation angle) of the telescope body 2 in a vertical direction (up-and-down direction) with respect to the outer frame 3 in accordance with the in and out motion of the driving shaft 4a (and the receiving shaft 4b) along the axis 4x which is a vertical line elongating in a up-and-down direction. Another angle adjustment mechanism, which is not shown, can be provided as a means to adjust an inclined angle (an azimuth angle) of the telescope body 2 in a horizontal direction (right-and-left direction) with respect to the outer frame 3. In any event, the sighting telescope 1 may be designed to obtain a predetermined angle adjusting feature (landing point adjusting feature, for example, Windage and Elevation Adjustments feature) as requested by shooting competition etc.

According to embodiment as described above, the sighting telescope 1 includes a guide support structure to rotatably guide the telescope body 2 and the outer frame 3 in a manner to be centered at the spherical center position 2y. This guide support structure comprises the first spherical sliding contact portion (the spherical surface sliding contact areas 2s, 3s) on the object side and the second spherical sliding contact portion (the spherical surface sliding contact areas 2t, 3t) on the eyepiece side in addition to a spherical surface support structure (hereinafter it is also referred to as "a rotational support structure") consisting of the supported portion 2p and the supporting portion 3p. For that reason, it is achievable to enhance an accuracy of adjustment of the inclined angle θ between the telescope body 2 and the outer frame 3 centered at the spherical center position 2y. For the same reason, it is attainable to strengthen the robustness of the sighting telescope 1 against fluctuation in the inclined angle θ.

Similarly, it is achievable to improve the accuracy of adjustment of the inclined angle θ between the telescope body 2 and the outer frame 3 centered at the spherical center position 2y with a plurality of the spherical sliding contact portions (the spherical surface sliding contact areas 2s, 3s, and 2t, 3t) around the same spherical center position 2y as the guide support structure which rotatably guides the telescope body 2 and the outer frame 3 centered at the predetermined spherical center position 2y, even if the spherical surface support structure consisting of the supported portion 2p and the supporting portion 3p are excluded. For the same reason, it is attainable to strengthen the robustness of the sighting telescope 1 against fluctuation in the inclined angle θ.

In particular, the sighting telescope 1 can obtain a stabilized guide support structure since the sighting telescope 1 has spherical sliding contact portions (rotational sliding contact portions) located on both sides (one side and the other side) of the spherical center position (rotational axis) on the optical axis (the axis 2x).

More specifically, in any of the above cases, the plurality of the guide support structures has a common spherical radius. For example, the first spherical sliding contact portion (the spherical surface sliding contact areas 2s, 3s) on the object side and the second spherical sliding contact portion (the spherical surface sliding contact areas 2t, 3t) on the eyepiece side have the same spherical radius, and thus the plurality of the guide support structures are configured to slidably guide along a common spherical surface as shown in FIG. 1. In this case, it is attainable to disperse and homogenize the supporting load and the sliding quantity on the guide support structures and to balance between the guide support structures. Therefore, the sighting telescope 1 can achieve compatibility between adjustment accuracy and shock resistance for holding the inclined angle at a higher level. It is also achievable to improve durability of each of the spherical sliding portions.

In the present embodiment, in both of the spherical surface sliding contact areas 2s, 3s on the object side and the spherical surface sliding contact areas 2t, 3t on the eyepiece side, the sliding surfaces 2s1, 3s1 and 2t1, 3t1 slide and contact on the entire circumference of the edges in the object side opening 3a located on the object side end 3b and the eyepiece side opening 3c located on the eyepiece side end 3d of the outer frame 3. Thus, a space between the telescope body 2 and the outer frame 3 becomes closed by means of the above sliding contact portions (regions), each of which is constituted by two surface sliding contact areas to be in mutually sliding contact, since a state of a mutually close contact at each of the spherical surface sliding contact areas is maintained within the adjustable range of the inclined angle θ (the elevation angle and the azimuth angle). For this reason, it is achievable to suppress a reduction in repeatability and in shock resistance for holding the inclined angle θ, derived from a foreign substance such as dust which invades and interposes between the telescope body 2 and the outer frame 3.

Note that, it is a matter of course that the present invention is not limited only to the above-described shown examples, and various modifications are possible within a range which does not deviate from the gist of the present invention. For instance, the sighting telescope may include a function unexplained in the above present embodiment, such as a focusing mechanism to make a part of an erecting lens group move toward the optical axis. Further, a telescopic function as illustrated is unnecessary in the sighting scope of the present invention, and the sighting scope may be a sight devise which merely has a sight function. In spite of the present or absence of the telescopic function, the present invention is significantly preferable when the scope body contains a barrel configuration including same kind of an optical structure.

Furthermore, in the above embodiment, the spherical surface support structures and the spherical sliding contact portions are designed on the premise of adjusting both of an elevation angle and an azimuth angle. However, when an adjustment of either an elevation angle or an azimuth angle, but not both is sufficient, rotational support structure and rotational sliding contact portions are sufficiently included. The rotational support structure and the rotational sliding contact portion may be configured to rotate the scope body 2 in a manner to be centered at a rotational axis with respect to the outer frame 3. In this case, the rotational axis is defined as an axis passing through the spherical center position 2y of the above embodiment on a (virtual) plane orthogonal to the axis 2x. The rotational axis is orthogonal to a (virtual) plane along the angle which adjustment thereof is required. The above supported surface 2p1 and the supporting surface 3p1, or the above sliding surface 2s1, 3s1, 2t1, 3t1 are not limited to spherical surfaces and may be cylindrical surfaces centered at the above rotational axis. The spherical surface support structure and the spherical sliding contact portion of the above embodiment are one example of a mechanism to be able to rotate centered at an arbitrary rotational axes passing through the spherical center position 2y on a (virtual) plane orthogonal to the above axis 2x.

1 . . . sighting telescope (sighting scope), 2 . . . telescope body (scope body), 2a . . . middle portion, 2b . . . objective side portion, 2c . . . eyepiece side portion, 2p . . . supported portion, 2p1 . . . supported surface, 2p2 . . . fastener, 2q, 2r . . . contact portion, 2s . . . spherical surface sliding contact area on the object side, 2s1 . . . sliding surface on the object side, 2t . . . spherical surface sliding contact area on the eyepiece side, 2t1 . . . sliding surface on the eyepiece side, 2x . . . axis, 2y . . . spherical center position, 3 . . . outer frame, 3a . . . object side opening, 3b object side end, 3c . . . eyepiece side opening, 3d . . . eyepiece side end, 3p . . . supporting portion, 3p1 . . . supporting surface, 3p2 . . . depressed portion, 3s . . . spherical surface sliding contact area on the object side, 3s1 . . . sliding surface on the object side, 3s2 . . . seal member, 3t . . . spherical surface sliding contact area on the eyepiece side, 3t1 . . . sliding surface on the eyepiece lens side, 3t2 . . . seal member, 3x . . . axis, 3m, 3n . . . connect portions, 4 . . . angular adjustment mechanism, 4a . . . driving shaft, 4b . . . receiving shaft, 4c . . . dial, 4d . . . driving mechanism, 4e . . . elastic body (coil spring), 4f . . . receiving member, 4x . . . axis, 5 . . . base

What is claimed is:

1. A sighting scope comprising:
a scope body having a first spherical surface sliding contact area,
an outer frame having an opening edge at an end, having a second spherical surface sliding contact area, and covering at least a middle portion along an optical axis of the scope body,
a rotational support structure rotatably supporting the scope body around a rotational axis located on a plane orthogonal to the optical axis inside of the outer frame, and
an angular adjustment mechanism which can adjust an inclined angle of the scope body with respect to the outer frame,
wherein the first spherical surface sliding contact area of the scope body rotatably and slidably contacts the second spherical surface sliding contact area of the outer frame around the rotational axis.

2. The sighting scope according to claim 1, wherein
the rotational support structure is a spherical support structure to rotatably support the scope body around a spherical center position located on the rotational axis, and
the first spherical surface sliding contact area of the scope body rotatably and slidably contacts the second spherical surface sliding contact area of the outer frame around the spherical center position.

3. The sighting scope according to claim 1, wherein
the first spherical surface sliding contact area of the scope body and the second spherical surface sliding contact area of the outer frame are configured entirely around the opening edge of the outer frame, and close a space between a surface of the scope body and the end of the outer frame.

4. A sighting scope comprising:
a scope body having a first spherical surface sliding contact area and a second spherical surface sliding contact area,
an outer frame having a first opening edge at a first end and a second opening edge at a second end, having a third spherical surface sliding contact area and a fourth spherical surface sliding contact area, and covering at least a middle portion along an optical axis of the scope body,
and
an angular adjustment mechanism which can adjust an inclined angle of the scope body with respect to the outer frame,
wherein the first spherical surface sliding contact area of the scope body rotatably and slidably contacts the third spherical surface sliding contact area of the outer frame around a rotational axis located on a plane orthogonal to the optical axis, and
the second spherical surface sliding contact area of the scope body rotatably and slidably contacts the fourth spherical surface sliding contact area of the outer frame around the rotational axis.

5. The sighting scope according to claim 4, wherein
the first spherical surface sliding contact area of the scope body rotatably and slidably contacts the third spherical surface sliding contact area of the outer frame around a spherical center position located on the rotational axis, and the second spherical surface sliding contact area of the scope body rotatably and slidably contacts the fourth spherical surface sliding contact area of the outer frame around the spherical center position.

6. The sighting scope according to claim 4, wherein
the first spherical surface sliding contact area of the scope body and the third spherical surface sliding contact area of the outer frame are configured entirely around the first opening edge of the outer frame, and close a space between a surface of the scope body and the first end of the outer frame, and
the second spherical surface sliding contact area of the scope body and the fourth spherical surface sliding contact area of the outer frame are configured entirely around the second opening edge of the outer frame, and close a space between the surface of the scope body and the second end of the outer frame.

7. A sighting scope comprising:
a scope body having a first spherical surface sliding contact area and a second spherical surface sliding contact area,
an outer frame having a first opening edge at a first end and a second opening edge at a second end, having a third spherical surface sliding contact area and a fourth spherical surface sliding contact area, and covering at least a middle portion along an optical axis of the scope body,
a rotational support structure rotatably supporting the scope body around a rotational axis located on a plane orthogonal to the optical axis inside of the outer frame, and
an angular adjustment mechanism which can adjust an included angle of the scope body with respect to the outer frame, and wherein
the first spherical surface sliding contact area of the scope body rotatably and slidably contacts the third spherical surface sliding contact area of the outer frame around the rotational axis, and
the second spherical surface sliding contact area of the scope body rotatably and slidably contacts the fourth spherical surface sliding contact area of the outer frame around the rotational axis.

8. The sighting scope according to claim 7, wherein the rotational support structure is a spherical support structure to rotatably support the scope body around a spherical center position located on the rotational axis, and
the first spherical surface sliding contact area of the scope body rotatably and slidably contacts the third spherical surface sliding contact area of the outer frame around the spherical center position, and
the second spherical surface sliding contact area of the scope body rotatably and slidably contacts the fourth spherical surface sliding contact area of the outer frame around the spherical center position.

9. The sighting scope according to claim 7, wherein
the first spherical surface sliding contact area of the scope body and the third spherical surface sliding contact area of the outer frame are configured entirely around the first opening edge of the outer frame, and close a space between a surface of the scope body and the first end of the outer frame, and
the second spherical surface sliding contact area of the scope body and the fourth spherical surface sliding contact area of the outer frame are configured entirely around the second opening edge of the outer frame, and close a space between the surface of the scope body and the second end of the outer frame.

* * * * *